US005686173A

United States Patent [19]

Fujii et al.

[11] Patent Number: 5,686,173

[45] Date of Patent: Nov. 11, 1997

[54] BIAXIALLY STRETCHED FILM FOR PACKAGING

[75] Inventors: Toshio Fujii; Kazuhiro Kato; Toyomitsu Kondo; Sinji Kawasaki, all of Kurashiki, Japan

[73] Assignee: Mitsubishi Chemical Corporation, Japan

[21] Appl. No.: 527,249

[22] Filed: Sep. 12, 1995

[30] Foreign Application Priority Data

| | | | |
|---|---|---|---|
| Sep. 13, 1994 | [JP] | Japan | 6-218471 |
| May 18, 1995 | [JP] | Japan | 7-120055 |

[51] Int. Cl.[6] .......... B32B 27/34; B32B 27/32

[52] U.S. Cl. .......... 428/213; 428/220; 428/475.8; 428/476.1; 428/476.3; 428/515; 428/516; 428/520; 428/476.9

[58] Field of Search .......... 428/475.8, 476.1, 428/476.3, 476.9, 500, 515, 516, 517, 220, 213, 520

[56] References Cited

U.S. PATENT DOCUMENTS

| | | | |
|---|---|---|---|
| 4,486,552 | 12/1984 | Niemann | 523/169 |
| 4,908,272 | 3/1990 | Harada et al. | 428/474.4 |
| 5,266,387 | 11/1993 | Fujii et al. | 428/213 |

FOREIGN PATENT DOCUMENTS

| | | |
|---|---|---|
| 0 288 972 | 11/1988 | European Pat. Off. . |
| 0 488 179 A1 | 6/1992 | European Pat. Off. . |
| 3-202346 | 9/1991 | Japan . |
| 4-86259 | 3/1992 | Japan . |
| 4-211922 | 8/1992 | Japan . |
| 6-122181 | 5/1994 | Japan . |
| 6-122182 | 5/1994 | Japan . |
| 6-155684 | 6/1994 | Japan . |
| 7-108660 | 4/1995 | Japan . |

*Primary Examiner*—Paul J. Thibodeau
*Assistant Examiner*—D. Lawrence Tarazano
*Attorney, Agent, or Firm*—Nixon & Vanderhye

[57] ABSTRACT

A biaxially stretched film for packaging, having a thickness of not more than 40 μm; comprising surface layers each made of a propylene-ethylene copolymer resin and an intermediate layer disposed therebetween made of a polyamide resin comprising an aromatic polyamide resin, and having thickness of 10 to 80% of the overall thickness of the biaxially stretched film; and obtained by a process comprising a coextrusion step, a rapid cooling step, and a stretching step.

13 Claims, No Drawings

BIAXIALLY STRETCHED FILM FOR PACKAGING

BACKGROUND OF THE INVENTION

The present invention relates to a biaxially stretched film used for packaging or wrapping of foodstuffs, etc. More particularly, it relates to a biaxially stretched film having excellent stretchability, cuttability, adhesiveness, transparency, heat resistance, water-vapor barrier property, odor barrier property, non-heat-shrinking properties and foodstuff hygienic safety, and suited for use as a packaging film.

Films principally made of polyvinylidene chloride, polyethylene or polyvinyl chloride are known as food wrapping films.

These known wrapping films, however, have their own problems. For instance, the films principally made of polyvinylidene chloride shrink greatly when heated, while the polyethylene-based films have the problem that they may be melted and broken when contacted with a fatty substance (such as meat, tempura, etc.) and heated to a high temperature. The films mainly composed of polyvinyl chloride suffer "whitening" when brought into contact with boiling water to make the contents invisible from the outside.

On the other hand, aliphatic polyamide resins are known as a heat-resistant resin usable for packaging film. Aliphatic polyamide resins have excellent heat resistance and mechanical strength but can hardly maintain their inherent physical properties for a long time because of a high hygroscopicity. In particular, nylon 6 and copolymer nylons such nylon 6/6,6 and nylon 6/6,10 are restricted in their use for foodstuff packaging in view of their foodstuff hygienic safety as their monomer component, ε-caprolactam tends to bleed on the film surface.

The wrapping film is usually contained in a case such as a paper tube, and in use, a desired length of the film is extended out and cut by a cutting blade called "saw blade" provided integrally with the case.

The "saw blade" used for cutting the wrapping film is usually a simple blade formed by merely stamping an approximately 0.2 mm-thick iron plate to the shape of saw blade. As the case having such a cutting blade, a board-carton box with a basis weight of about 350 to 700 g/m$^2$, which is quite low in rigidity, is usually used.

This type of wrapping film is required that it can be properly cut with ease according to the user's intention even by the simple cutting mechanism such as mentioned above. Actually, however, it sometimes occurs that the case or the saw blade, or even the film, is deformed in use and cutting is effected at a wrong position deviating from the saw blade. Specifically, the conventional polyethylene films require a fairly large tensile force for cutting, which may cause bending of the case or deformation of the film.

The present inventors have studied for producing a packaging film freed of the above problems of conventional wrapping films and, as a result, found that by laminating layers of polypropylene-based resin on both sides of a polyamide resin layer containing an aromatic polyamide resin by a specific coextrusion-film-forming method and biaxially stretching the laminated film, the above problems can be solved and there can be obtained a packaging film having excellent cuttability, transparency, heat resistance, water-vapor barrier property, odor barrier property, non-heat-shrinking properties and foodstuff hygienic safety without impairing the inherent properties (heat resistance and mechanical strength) of polyamide resins. The present invention has been attained on the basis of the finding.

SUMMARY OF THE INVENTION

An object of the present invention is to provide a packaging film having excellent stretchability, cuttability, adhesiveness, transparency, heat resistance, water-vapor barrier property and odor barrier property, non-heat-shrinking properties and food hygienic safety.

To accomplish the aim, in an aspect of the present invention, there is provided a biaxially stretched film for packaging, having a thickness of not more than 40 μm; comprising surface layers each made of a propylene-based resin and an intermediate layer disposed therebetween made of a polyamide resin comprising an aromatic polyamide resin, and having thickness of 10 to 80% of the overall thickness the biaxially stretched film; and obtained by a process comprising a coextrusion step, a rapidly cooling step and a stretching step.

DETAILED DESCRIPTION OF THE INVENTION

The packaging film of the present invention has a laminated structure of at least three layers.

The polypropylene-based resin used for the surface layers of the packaging film of the present invention is not limited to specific types, and it is possible to use homopolymers of propylene and copolymers of propylene and ethylene or the like. Examples of propylene homopolymers usable in the present invention are isotactic polypropylene, syndiotactic polypropylene and atactic polypropylene.

The copolymers of propylene and other monomeric materials such as ethylene may be either random copolymers or block copolymers. The physical properties of the polypropylene-based resin used in the present invention may be properly selected depending on the purpose of use, use conditions and other factors but usually, it is preferable that the resin has a melt flow rate (MFR) of 0.5 to 10 g/10 min and a density of 0.89 to 0.91 g/cm$^3$. The melt flow rate herein is determined according to JIS K6758 at 230° C. under a load of 2.16 kg.

With a polypropylene-based resin such as mentioned above, proper additives such as mentioned below may be blended to provide a wrapping film having superior properties.

For example, a composition is obtained by adding (A) 3 to 40 parts by weight of polybutene or polyisobutylene, (B) 0.2 to 10 parts by weight of an anti-fogging agent and (C) 0.1 to 10 parts by weight of a release agent, based on 100 parts by weight of a polypropylene-based resin.

Polybutene or polyisobutylene used as the component (A) serves as a thickener and provides superior adhesiveness to the film. The amount of polybutene or polyisobutylene blended in the composition is, if any, 3 to 40 parts by weight, preferably 10 to 25 parts by weight, based on 100 parts by weight of the polypropylene-based resin. When the blended amount is less than 3 parts by weight, the produced film may not have sufficient adhesiveness, and when the amount exceeds 40 parts by weight, the film surface may become sticky due to heavy bleeding and also heat resistance may be lowered. The physical properties of polybutene or polyisobutylene used here are not particularly specified as they can be properly selected in accordance with the blended amount, type of other component materials, purpose of use of the objective composition and other factors, but usually, it is preferable that the polymer has a number average molecular weight of 200 to 5,000, more preferably 400 to 4,000, still more preferably 500 to 2,000.

The anti-fogging agent (B) is a component for affording an anti-fogging property to the film. The anti-fogging agent includes a substance which is commercially sold as an antistatic agent and the like provide that such substance shows an anti-fogging effect. The anti-fogging agent (B), when used in combination with polybutene or polyisobutylene, increases adhesiveness of the film. It also has the effect of making the film less prone to become cloudy even when vapor comes into contact with the film.

Of the anti-fogging agents (B), a fatty acid ester formed from a polyhydric alcohol with 3 to 20 of hydroxyl groups is preferred. The fatty acid ester formed from the polyhydric alcohol is a compound in which at least one of hydroxyl groups of a polyhydric alcohol has been esterified with a fatty acid such as a higher fatty acid having a carbon number of 8 to 22. The polyhydric alcohol includes condensate of glycerin. The glycerin condensate has a polymerization degree of usually 2 to 10, preferably 2 to 6. Of the hydroxyl groups of the glycerin condensate, the number of the esterified hydroxyl group is not less than 1, preferably not less than 1 and not more than 70% of the total number of the hydroxyl groups, more preferably not less than 1 and not more than 60% of the total number of the hydroxyl groups. The higher fatty acid may be either saturated or unsaturated as far as the fatty acid has a carbon number of 8 to 22, and usually the fatty acid having a carbon number of 10 to 18 is preferred.

Examples of the fatty acid ester formed from the polyhydric alcohol include monoglycerin oleate, glycerin trirecinoleate, glycerin acetylrecinoleate, pentaerythritol, sorbitan oleate, sorbitan luarate, polyethylene glycol sorbitan oleate, polyethylene glycol sorbitan laurate, diglycerin monoluarate, diglycerin monopalmitate, diglycerin monooleate, diglycerin monostearate, diglycerin dioleate, and triglycerin monooleate. Of these fatty acid esters, diglycerin monolaurate and diglycerin monooleate are preferred.

The fatty acid esters formed from the polyhydric alcohols may be used in combination with two or more of them. The fatty acid ester is, if any, used in an amount of 0.2 to 10 parts by weight, preferably 1 to 6 parts by weight, based on 100 parts by weight of propylene-based resin. When the amount of the fatty acid ester blended is less than 0.2 part by weight, there may not be produced the synergistic effect of the ester with polybutene or polyisobutylene used as the component (A). When the blended amount of the ester exceeds 10 parts by weight, the produced film may have a sticky surface or a smell due to heavy bleeding. Also, gel tends to form.

The release agent (C) is a component for facilitating unwinding of the rolled film. It is preferably a mixed glyceride having an acyl group with a carbon number of 2 to 6 and an acyl group with a carbon number of 8 to 22. The "mixed glyceride" means a diacyl or triacyl compound in which one of the three hydroxyl groups of glycerin is esterified with a $C_2$-$C_6$ lower fatty acid, another one is esterified with a $C_8$-$C_{22}$ higher fatty acid and still another one remains as the original hydroxyl group or is esterified with a $C_2$-$C_6$ lower fatty acid or a $C_8$-$C_{22}$ higher fatty acid. The all acyl groups of the triacyl compound may be different from each other. The higher fatty acid may be either saturated or unsaturated as long as they are the fatty acid has a carbon number of 8 to 22, preferably 10 to 18. Any lower fatty acid can be used so long as the carbon number of the lower fatty acids is 2 to 6.

Examples of the mixed glycerides include diacetylmonolauryl glycerin, diacetylmonopalmityl glycerin, diacetylmonooleyl glycerin, monoacetyldilauryl glycerin, monoacetylmonopalmityl glycerin, monoacetyldioleyl glycerin, monoacetylmonolauryl glycerin, monoacetylmonooleyl glycerin, dipropionylmonolauryl glycerin, dicaproylmonolauryl glycerin, dicaproylmonopalmityl glycerin, monoacetylmonocapryl glycerin, monoacetylmonobrassidyl glycerin, monopropionylmonobrassidyl glycerin and monoacetylmonoerucyl glycerin. Of these glycerides, diacetylmonolauryl glycerin and diacetylmonooleyl glycerin are preferred.

These mixed glyceride may be used in combination of two or more. The film molded from the polypropylene-based resin composition containing the release agent (C) has superior adhesiveness and can be easily attached tightly to an object with no need of using a particular pressing force. Releasability between films is also improved to allow easy and smooth unwinding of the film when used. Further, transparency of the film is improved.

The release agent (C) is, if any, blended in an amount of 0.1 to 10 parts by weight, preferably 1.0 to 5.0 parts by weight, based on 100 parts by weight of a polypropylene-based resin. When the amount is less than 0.1 part by weight, its effect of affording adhesiveness or improving transparency may be unsatisfactory, and when the amount exceeds 10 parts by weight, the produced film may be too sticky or slippery and bad in handling qualities.

The polyamide resin used for the intermediate layer of the packaging film of the present invention contains an aromatic polyamide resin. The content of such an aromatic polyamide resin is preferably not less than 2% by weight. As the resin which is blended with the aromatic polyamide resin, an aliphatic polyamide resin may be used.

The "aromatic polyamide resin" herein refers to polyamides having an aromatic ring, for example, aromatic polyamides composed of aliphatic diamine units and aromatic dicarboxylic acid units, aromatic polyamides composed of aromatic diamine units and aliphatic dicarboxylic acid units, and copolyamides composed of the aromatic polyamide structural units and aliphatic polyamide structural units selected from lactam or aliphatic diamine units and aliphatic dicarboxylic acid units.

The case of the copolyamide, the copolyamide contains not less than 10% by weight of aromatic polyamide units. When the content of aromatic polyamide units is less than 10% by weight, the produced film may fail to have a desired transparency. For obtaining a film having high gas barrier properties, the content of the aromatic polyamide units is preferably not less than 85% by weight.

Examples of the monomers composing the aromatic polyamide resin include those mentioned below. For example, the aromatic diamine units may include units of o-, m- or p-xylylene diamine, and the aromatic dicarboxylic acid units include units of terephthalic acid, isophthalic acid, and methyl esters, ethyl esters and halides thereof. These monomers may be used as a mixture of two or more of them. The aliphatic diamine units include units of a linear aliphatic diamine such as ethylenediamine, tetramethylenediamine, hexamethylenediamine, octamethylenediamine, and decamethylenediamine. As the lactam, there can be used caprolactam, lauryllactam and the like. The aliphatic dicarboxylic acids include succinic acid, glutaric acid, adipic acid, pimelic acid, suberic acid, azelaic acid, sebacic acid, and derivatives thereof such as methyl esters, ethyl esters and halides.

For producing the aromatic polyamide resin, the methods commonly used for producing polyamide resins, for example, a melt polymerization method using a nylon salt composed of diamine units and dicarboxylic acid units and an optional lactam or an aqueous solution thereof, may be used. Solution polymerization or interfacial polymerization method is also usable depending on the ratio of isophthalic acid units to terephthalic acid units.

Preferred examples of the aromatic polyamide resins include (a) polymers composed of aromatic polyamide structural units of aliphatic diamine units and isophthalic acid units and/or terephthalic acid units, and (b) copolyamides composed of the aromatic polyamide structural units of (a) and aliphatic polyamide structural units of lactam or aliphatic diamine units and aliphatic dicarboxylic acid units.

The ratio of isophthalic acid units to terephthalic acid units is not specified and can be selected freely, but in case the ratio of aliphatic polyamide structural units in the aromatic polyamide resin is low, when the ratio of terephthalic acid units is high, the melting point of the obtained polyamide resin may become nor less than 300° C. This may make lamination with an acid-modified polyolefin and the like difficult, so that it is preferable to make the ratio of terephthalic acid units in the acid units nor more than 50% by weight. Usually, the isophthalic acid unit/terephthalic acid unit ratio (by weight) is 20/80 to 80/20. The aromatic polyamide resin may be used either singly or in combination of two or more of them.

As the aliphatic polyamide resin to be mixed with the aromatic polyamide resin in the polyamide resin according to the present invention, there are usually used those having a relative viscosity of about 1 to 6. Examples of the aliphatic polyamide resin include polyamides obtained by polycondensation of aliphatic or alicyclic diamines such as hexamethylenediamine, decamethylenediamine, dodecamethylenediamine, trimethylhexamethylenediamine, 1,3- or 1,4-bis(aminomethyl)cyclohexane, and bis(p-aminocyclohexylmethane), and aliphatic or alicyclic dicarboxylic acids such as adipic acid, suberic acid, sebacic acid, and cyclohexanedicarboxylic acid; polyamides obtained by condensation of aminocarboxylic acids such as ϵ-aminocaproic acid, and 11-aminoundecanoic acid; polyamides obtained from lactams such as ϵ-caprolactam and ϵ-laurolactam; and their copolymer polyamides. Specifically, nylon-6, nylon-66, nylon-610, nylon-9, nylon-11, nylon-12, nylon-6/66, nylon 66/610, nylon 6/11 and the like can be mentioned.

The aliphatic polyamide preferably has a melting point of 170° to 280° C., more preferably 200° to 240° C., in view of moldability. Nylon-6 and nylon-66 are especially preferred.

Use of the polyamide resin containing the aromatic polyamide resin such as mentioned above contributes to the improvement of stretchability and gas barrier properties of the film. More specifically, when the polyamide resin containing the aromatic polyamide resin is used, the film becomes less liable to break when stretched and can be produced more stably than when an aliphatic polyamide alone is used.

In case an aliphatic polyamide resin alone is used, when the area stretching ratio given by the product of longitudinal (machine) direction-stretching ratio and transverse direction-stretching ratio is not less than 15, the film is apt to break when stretched and its production is unstable. When the area stretching ratio is less than 15, polypropylenes in the surface layer is unable to be uniformly stretched, causing uneven stretch of the film (streaks are formed because of insufficient stretch in part). Mixing of an aromatic polyamide resin in an amount of preferably not less than 2% by weight, more preferably 2 to 60% by weight, still more preferably 4 to 40% by weight, can improve stretchability of the film to greatly alleviate the problem of break in use.

The barrier properties of the film are also improved because of the excellent barrier properties of the aromatic polyamide resin itself. Especially, the barrier properties in a high humidity condition are improved in comparison with the film using an aliphatic polyamide resin alone.

It is essential that the multi-layer film of the present invention has a structure of at least three layers. An adhesive layer may be additionally provided as desired. The adhesive layer is provided between the surface layer and the intermediate layer. An acid-modified polyolefin resin is preferable for use as the adhesive layer material.

An acid-modified polyolefin-based resin used optionally in the present invention can be obtained by graft-reacting an unsaturated carboxylic acid or a derivative thereof with polypropylene and/or polyethylene. If necessary, a composition of polypropylene and/or polyethylene mixed with an elastomer may be used.

Various methods are available for effecting the above graft reaction. Examples thereof are a method in which a polyolefin and an unsaturated carboxylic acid are reacted in a molten state (Japanese Patent Publication (KOKOKU) No. 43-27421), a method in which the reaction is carried out in a solution state (Japanese Patent Publication (KOKOKU) No. 44-15422), a method in which the reaction is conducted in a slurry state (Japanese Patent Publication (KOKOKU) No. 43-18144) and a method in which the reaction is performed in a gas phase (Japanese Patent Application Laid-Open (KOKAI) No. 50-77493). A melt kneading method using an extruder is preferred because of operational simplicity.

As a raw material for producing the acid-modified polyolefin resin, there can be used, for instance, homopolymers and copolymers of propylene and ethylene. Such copolymers include random or block copolymers of propylene and 1–5% by weight of ethylene, random or block copolymers of ethylene and 1–10% by weight of propylene, copolymers of propylene and 1–10% by weight of α-olefins with a carbon number of not less than 4, and mixtures thereof. Of these materials, the homopolypropylene and propylene-ethylene random copolymer having a melt flow rate of 0.5 to 30 g/10 min, preferably 5 to 15 g/10 min, and the polyethylene and ethylene-α-olefin copolymer having a melt flow rate of 0.3 to 30 g/10 min are preferred.

The melt flow rate (MFR) shown here is one determined at 230° C. in the case of polypropylenes and at 190° C. in the case of polyethylenes.

Examples of the unsaturated carboxylic acid include acrylic acid, methacrylic acid, maleic acid, fumaric acid, itaconic acid, citraconic acid, and their acid anhydrides, esters, amides, imides, and metal salts. Maleic anhydride is most preferable.

An organic peroxide may be used for promoting the reaction of a polyolefin and an unsaturated carboxylic acid. Examples of the organic peroxide are benzoyl peroxide, lauroyl peroxide, azobisisobutyronitrile, dicumyl peroxide, α,α'-bis(t-butylperoxydiisopropyl)benzene, 2,5-dimethyl-2,5-di(t-butylperoxy)hexane, 2,5-dimethyl-2,5-di(t-butylperoxy)hexyne-3, di-t-butyl peroxide, cumene hydroperoxide, and t-butyl hydroperoxide. The amount of the organic peroxide to be added is not specified, but it is usually 0.005 to 5 parts by weight, preferably 0.01 to 1 part by weight, based on 100 parts by weight of the polyolefin.

An acid-modified polyolefin resin grafted with an unsaturated carboxylic acid may be obtained by mixing a polyolefin, an unsaturated carboxylic acid and an organic peroxide such as mentioned above by a suitable mixer such as a tumbler or a Henschel mixer and melt-kneading at a temperature above the melting point of the polyolefin, usually between the melting point and 280° C. to perform a graft reaction. Melt kneading method is not specified in the present invention, and it may be accomplished by using, for example, a screw extruder, a Banbury mixer, mixing rolls or the like, but use of a screw extruder is preferable for the operational simplicity. The temperature and time of melt kneading vary depending on the decomposition temperature of the organic peroxide used, but usually melt kneading is carried out at 160° to 280° C., preferably at 170° to 250° C. for 0.3 to 30 minutes, preferably for 1 to 10 minutes.

The graft ratio of the unsaturated carboxylic acid in the acid-modified polyolefin resin is usually 0.01 to 3% by weight, preferably 0.03 to 1% by weight. When the graft ratio of the unsaturated carboxylic acid is less than 0.01% by weight, adhesiveness of the produced film is unsatisfactory, and when the graft ratio is above 3% by weight, gelation may be increased to cause an adverse effect.

In the present invention, the acid-modified polyolefin resin may be mixed with a non-modified polyolefin resin at a ratio of up to 2,000 parts by weight based on 100 parts by weight of the acid-modified polyolefin resin. In this case, both resins are preferably mixed in such a manner that the graft ratio of the unsaturated carboxylic acid in the mixture will fall in the above-defined range. As the non-modified polyolefin resin, there can be used, for instance, polypropylene or polyethylene which is the base material of the acid-modified polyolefin resin.

The acid-modified polyolefin composition used in the present invention may contain additives such as a heat resisting stabilizer in a commonly used amount, such as about 0.0005 to 30% by weight.

The acid-modified polyolefin resin such as mentioned above may be mixed with the polypropylene-based resin in the surface layer to enhance adhesiveness between the surface layer and the intermediate layer.

The structure of the film of the present invention may have an additional layer or layers having a function other than the adhesive layers. For instance, a recycle layer using the crushed material of the defectives produced during film forming may be provided.

The packaging film of the present invention is produced by forming a multi-layer film, for example, a film having a three-layer structure of: polypropylene-based resin/polyamide containing aromatic polyamide resin/polypropylene-based resin by specific coextrusion film formation from a polypropylene-based resin and a polyamide resin containing an aromatic polyamide resin such as mentioned above, and biaxially stretching the formed film in both machine (or longitudinal) and transverse directions. As for the order of stretching, the film may be stretched first either in the machine direction or in the transverse direction, or may be stretched simultaneously in both directions.

For the coextrusion film formation, a T-die molding method or a water-cooled inflation method is employed. Namely, by rapidly cooling (quenching) the melt-extruded resin, there can be obtained a film having better transparency and stretchability as compared with the commonly used air-cooling inflation method.

Rapid cooling of the extruded resin makes it possible to obtain the crystallinity at a low level, resulting in a significant improvement of transparency and stretchability. In the conventional air-cooling inflation method, the rapid cooling effect is small and the film tends to break when stretched, particularly in the transverse direction.

Rapidly cooling can be effected, in the case of the T-die molding method, by contacting the extrudate with the rolls having a surface temperature not more than 50° C., preferably not more than 35° C., and in the case of the water-cooling inflation method, by contacting the extrudate with cooling water of a temperature not more than 50° C., preferably not more than 35° C.

The non-stretched multilayer film obtained by said coextrusion film forming method is then stretched in both machine (or longitudinal) and transverse directions. The film is preferably stretched 2 to 6 times, more preferably 2.5 to 4 times in each direction. When the stretch ratio is less than 2 times, the produced film tends to be unsatisfactory in curtability, and when the stretch ratio is more than 6 times, the film may be reduced in stretchability and, when stretched, tends to break or be stretched nonuniformly. In case the film is biaxially stretched successively, the non-stretched film, which may be either in the form as it was prepared or may be slit to a desired width and heated, is stretched in the film take-up direction, namely in the machine direction, by changing the peripheral speed of the stretching roll. Preheating for the stretching operation is conducted usually at a temperature not more than the temperature of 20° C. lower than the melting point of the polypropylene-based resin, preferably at 40° to 120° C.

Transverse stretching is usually conducted by a tenter stretcher. Preheating for this operation is usually conducted at a temperature of not more than the temperature of 10° C. lower than the melting point of polypropylene-based resin, preferably at 50° to 140° C.

Heat setting after stretching is conducted at a temperature higher than the preheating temperature. The highest possible temperature is preferably used for preventing wrinkling of the film and for providing superior non-heat-shrinking properties. Usually, a temperature which is about 10° C. lower than the melting point of the polypropylene-based resin, and specifically a temperature from 80° to 150° C. is preferably used for heat setting.

When the preheating and heat setting temperatures are above the appropriate ranges as defined above, the film may be fused and adhere to the stretching rolls when the film is stretched in the machine direction, and when the preheating temperature is below the appropriate range, it may be difficult to stretch the film because of insufficient preheating of the polyamide resin and breakage of the film may be caused when stretched.

Biaxial stretching may be performed simultaneously instead of conducting it successively as described above. There are available a tenter system and a tubular system for simultaneous biaxial stretching. The concept relating to preheating and heatsetting temperatures is the same for both systems of stretching.

This film stretching improves cuttability of the film, making it possible to easily cut the film to a desired length with a light force by a saw blade.

The overall thickness of the packaging film according to the present invention is not more than 40 μm, preferably 2 to 30 μm, more preferably 5 to 20 μm. The thickness of the intermediate layer is 10 to 80% of the overall film thickness. When the overall thickness of the film is greater than 40 μm, the film has a too high tear strength to cut with ease and is unsuited for use as a wrapping film.

When the thickness of the intermediate layer is less than 10% of the overall film thickness, the polyamide resin used for the layer is unable to exhibit properties of itself such as heat resistance and mechanical strength. When the intermediate layer thickness is greater than 80% of the overall film thickness, the polypropylene-based resin layer thickness is excessively reduced and it becomes difficult to uniformly cover the intermediate layer by coextrusion film forming. It is thus desirable that the intermediate layer thickness is not greater than 80% of the overall film thickness.

As for adhesive strength of the film, in view of practical use as a stretch film or a wrapping film, it is preferable that the film has a shear peel strength of not less than 0.40 $kg/cm^2$ and a 180° peel strength of not higher than 4.0 g/50 mm.

The packaging film of the present invention can be used for various types of packaging such as food packaging. It can also be suitably used as a wrapping film by imparting self-adhesiveness to both surface layers of the film in a manner such as described above.

The packaging film of the present invention has excellent stretchability, cuttability, transparency, heat resistance, water-vapor barrier property, odor barrier property and non-heat-shrinking properties. Also, since bleeding of ε-caprolactam, which is the base monomer of nylon-6 and its copolymer nylons, to the film surface is prevented by laminating the polypropylene-based resin, the film has excellent food hygienic safety.

EXAMPLES

The present invention is described in more detail below with reference to the examples embodying the present invention, but the following examples are merely intended to be illustrative and not to be construed as limiting the scope of the invention.

Measurements in the following Examples are made by the methods described below.

(1) Moisture permeability

It is measured according to JIS Z0208 under the conditions of 40° C. and 90% RH. It is desirable that the film has a moisture permeability not exceeding 120 $g/m^2$.24 hr.

(2) Transparency

It is measured using a clarity meter manufactured by Murakami Shikisai Gijutsu Kenkyusho Ltd. There are obtained three values of measurement: maximum, minimum and average, and here is shown the maximum value which best represents the visual appreciation. It is desirable that the film has a transparency not less than 80%.

(3) Heat endurance temperature

There is prepared a 30 mm wide and 14 cm long film strip, and a load of 10 g is applied thereto with paper attached at both upper and lower ends of the specimen to a length of 25 mm. The highest ambient temperature at which the film specimen remained uncut for one hour is measured by raising the temperature in increments of 10° C. It is desirable that the film has a heat endurance temperature of not less than 140° C. both in length and width.

(4) Heat shrinkage

A 10 mmφ specimen is stamped out from the sample film. This specimen is immersed in silicone oil contained in an aluminum pan and the pan is placed on a 140° C. hot plate. The temperature of the hot plate once lowers since heat is taken by the aluminum pan. 45 seconds after the temperature reaches 140° C., the specimen is taken out of the pan and its size change is measured. It is desirable that heat shrinkage of the film is not more than 30% longitudinally and not more than 30% transversely.

(5) Cuttability

Tearability of the film is evaluated using a PPT tear tester manufactured by Testing Machines Inc., U.S. In the test, a weight of a specified load having a needle is dropped onto the sample film from a specified height, and the length of the film torn is measured to determine tearability. The sample film is set in such a situation that tear would occur transversely to the film, and the length of tear is measured. A greater length of tear of a film in the test means that a less force is needed to cut the film, hence better cuttability. The test is conducted by dropping a 30 g weight from a height of 50 cm. It is desirable that the tear length is not less than 50 mm.

(6) Adhesive strength

Two pieces of sample film are placed one on the other lightly, and then they are pressed down by a 25 mmφ and 150 mm-wide roll under a linear pressure of 0.3 kg/cm. The force required for shear peeling the two pieces of film from each other within a period of 5 minutes and the force required for peeling the two pieces of film from each other in the direction of 180° are measured by an instron type tension tester. It is desirable that the film has a shear peel strength of not lower than 0.40 $kg/cm^2$ and a 180° peel strength of not higher than 4.0 g/50 mm.

Example 1

Using a 450 mm-wide, 3-type-5-layer coextruding T-die molding machine, the resins shown in Table 1 were extruded simultaneously from three extruders at a die temperature of 280° C. and subjected to a film forming process under the conditions of a chill roll temperature of 30° C. and a take-off speed of 12 m/min to form a 3-type-5-layer raw film (polypropylene-based resin/acid-modified polyolefin resin/polyamide resin/acid-modified polyolefin resin/polypropylene-based resin; thickness: 120 μm; layer thickness ratio: 1:1:1:1:1). This raw film was roll-stretched 3 times in the machine direction at a preheating temperature of 50° C., then tentered 4 times in the transverse direction at a preheating temperature of 100° C. and finally heat set at 130° C. Moisture permeability, transparency, heat endurance temperature, heat shrinkage, cuttability and adhesive strength of the obtained film were determined by the methods described above. The results are shown in Table 2.

TABLE 1

| Extruder | Layers | Feedstock resins* | |
|---|---|---|---|
| 1st extruder (40 mmφ) | Surface layer | Polypropylene-based resin | 100 parts by weight |
| | | (A) Polybutene | 12 parts by weight |
| | | (B) Anti-fogging agent | 2 parts by weight |
| | | (C) Releasing agent | 2 parts by weight |
| 2nd extruder (40 mmφ) | Intermediate layer | Polyamide resin | |
| 3rd extruder (32 mmφ) | Adhesive layer | Acid-modified polyolefin resin | |

*Resins in Table 1: Polypropylene-based resin (propylene-ethylene random copolymer): MITSUBISHI POLYPRO 6500J, produced by Mitsubishi Chemical Corp.; MFR: 9 g/10 min (at 230° C.); ρ: 0.9 $g/cm^3$.

(A) Polybutene: NISSEKI POLYBUTENE LV-100, produced by Nippon Petrochemicals Co., Ltd.; number average molecular weight: 500.

(B) Anti-fogging agent: diglycerin monooleate, RIKEMAL O-71-DE, produced by Riken Vitamin Co., Ltd.

(C) Releasing agent: diacetylmonolauryl glyceride, POEM G-002, produced by Riken Vitamin Co., Ltd. Polyamide resin: a mixture of 80 parts by weight of nylon-6, NOVAMID 1020, sold by Mitsubishi Engineerings-Plastics Corp., and 20 parts by weight of an aromatic polyamide (copolyamide of hexamethylenediamine and isophthalic acid/terephthalic acid (2/1)) (NOVAMID X21, sold by Mitsubishi Engineerings-Plastics Corp.).

Acid-modified polyolefin resin: an acid-modified polypropylene resin, MODIC AP196P, produced by Mitsubishi Chemical Corp.; MFR: 2.7 g/10 min (230° C.).

Example 2

The same procedure as in Example 1 was carried out except that the thickness ratio of the layers of the multilayer film was made 3:1:2:1:3. The results are shown in Table 2.

Example 3

The same procedure as in Example 1 was carried out except that the raw film was formed by a water-cooling inflation method at a cooling water temperature of 30° C. The results are shown in Table 2. In this Example, a raw film having a thickness of 120 μm and a flat width of 190 mm was formed under the following conditions: die diameter: 75 mm; die temperature: 250° C.; blow-up ratio: 1.6; take-off speed: 10 m/min.

Example 4

The same procedure as in Example 1 was carried out except that the raw film was formed by a water-cooling inflation method at a cooling water temperature of 30° C., that the film was stretched by a tubular biaxial stretching system, that preheating was conducted at 110° C., and that heat setting was conducted at 130° C. The results are shown in Table 2.

Example 5

The same procedure as in Example 1 was carried out except that the mixing ration of the aliphatic polyamide resin and the aromatic polyamide resin was changed to 50/50 in % by weight. The results are shown in Table 2.

Examples 6 to 10

The same procedures as in Examples 1 to 5 were carried out except that the polybutene having a number average molecular weight of 500 was replaced by one having a number average molecular weight of 750 (NISSEKI POLYBUTENE HV-35 produced by Nippon Petrochemicals Co., Ltd.). The results are shown in Table 2.

Comparative Examples 1 to 4

The same procedures as in Example 1 were carried out except that the film thickness, film layer thickness ratio and the stretch ratio were changed as shown in Table 2. The results are shown in Table 2.

Comparative Example 5

The same procedure as in Example 1 was carried out except that the raw film was formed by an air-cooling inflation method. The results are shown in Table 2. In this Comparative Example, a raw film having a thickness of 120 μm and a flat width of 250 mm was formed under the following conditions: die diameter: 100 mmφ; die temperature: 250° C.; blow-up ratio: 1.6; take-off speed: 13 m/min.

Comparative Example 6

The same procedure as in Example 1 was carried out except that the intermediate layer was made of an aliphatic polyamide resin alone. The results are shown in Table 2.

Comparative Example 7

The same procedure as in Comparative Example 6 was carried out except that the film stretch ratio was changed as shown in Table 2. The results are shown in Table 2.

Examples 11 to 12

The same procedure as in Example 1 was carried out except that the polybutene having a number average molecular weight of 500 was replaced by one having a number average molecular weight of 750 (NISSEKI POLYBUTENE HV-35 produced by Nippon Petrochemicals Co., Ltd.), and the ratio of aromatic polyamide was changed as shown in Table 2. The results are shown in Table 2.

TABLE 2

| Case | Ratio of aromatic polyamide (%) | Final film thickness (μm) | Thickness ratio of layers | Stretch ratio (longitudinal × transverse) | Moisture permeability ($g/m^2 \cdot 24$ hr) | Transparency (%) | Heat endurance temperature (longitudinal/transverse) (°C.) | Heat shrinkage (longitudinal/transverse) | Cuttability (mm) | Shear peel strength ($kg/cm^2$) | 180° C. peel strength (g/50 mm) |
|---|---|---|---|---|---|---|---|---|---|---|---|
| Ex. 1 | 20 | 10 | 1:1:1:1:1 | 3 × 4 | 30.8 | 84 | 180/180 | 20/17 | 138 | 1.29 | 2.01 |
| Ex. 2 | 20 | 10 | 3:1:2:1:3 | 3 × 4 | 31.9 | 85 | 180/180 | 18/17 | 143 | 1.31 | 1.97 |
| Ex. 3 | 20 | 10 | 1:1:1:1:1 | 3 × 4 | 30.2 | 83 | 180/180 | 20/20 | 135 | 1.33 | 1.95 |
| Ex. 4 | 20 | 10 | 1:1:1:1:1 | 3 × 4 | 29.6 | 84 | 180/180 | 17/18 | 140 | 1.28 | 2.03 |
| Ex. 5 | 50 | 10 | 1:1:1:1:1 | 3 × 4 | 26.3 | 88 | 180/180 | 22/20 | 140 | 1.30 | 1.88 |
| Ex. 6 | 20 | 10 | 1:1:1:1:1 | 3 × 4 | 30.6 | 85 | 180/180 | 18/16 | 140 | 1.32 | 1.98 |
| Ex. 7 | 20 | 10 | 3:1:2:1:3 | 3 × 4 | 30.9 | 85 | 180/180 | 16/15 | 141 | 1.31 | 1.95 |
| Ex. 8 | 20 | 10 | 1:1:1:1:1 | 3 × 4 | 30.1 | 84 | 180/180 | 19/18 | 139 | 1.34 | 1.96 |
| Ex. 9 | 20 | 10 | 1:1:1:1:1 | 3 × 4 | 28.7 | 85 | 180/180 | 16/16 | 142 | 1.30 | 1.99 |
| Ex. 10 | 50 | 10 | 1:1:1:1:1 | 3 × 4 | 25.9 | 88 | 180/180 | 21/20 | 141 | 1.32 | 1.85 |
| Ex. 11 | 5 | 10 | 1:1:1:1:1 | 3 × 4 | 31.4 | 84 | 180/180 | 15/16 | 140 | 1.31 | 1.90 |
| Ex. 12 | 10 | 10 | 1:1:1:1:1 | 3 × 4 | 31.2 | 83 | 180/180 | 17/17 | 139 | 1.28 | 1.86 |
| Comp. Ex. 1 | 20 | 10 | 1:1:1:1:1 | 1.5 × 1.5 | 43.5 | 72 | 180/180 | 6/4 | 42 | 1.12 | 2.10 |
| Comp. Ex. 2 | 20 | 10 | 1:1:1:1:1 | 7 × 7 | No specimen could be obtained because of film breakage. | | | | | | |

TABLE 2-continued

| Case | Ratio of aromatic polyamide (%) | Final film thickness (μm) | Thickness ratio of layers | Stretch ratio (longitudinal × transverse) | Moisture permeability (g/m² · 24 hr) | Transparency (%) | Heat endurance temperature (longitudinal/transverse) (°C.) | Heat shrinkage (longitudinal/transverse) | Cuttability (mm) | Shear peel strength (kg/cm²) | 180° C. peel strength (g/50 mm) |
|---|---|---|---|---|---|---|---|---|---|---|---|
| Comp. Ex. 3 | 20 | 50 | 1:1:1:1:1 | 3 × 4 | 6.8 | 68 | 190/190 | 9/11 | 46 | 1.66 | 3.11 |
| Comp. Ex. 4 | 20 | 10 | 1:1:1:1:1 | 3 × 1.5 | 36.2 | 78 | 180/180 | 18/6 | 70 | 1.41 | 2.05 |
| Comp. Ex. 5 | 20 | 10 | 1:1:1:1:1 | 3 × 4 | 31.0 | 45 | 180/180 | 18/19 | 113 | 1.28 | 1.96 |
| Comp. Ex. 6 | 0 | 10 | 1:1:1:1:1 | 3 × 4 | Streaks were formed due to nonuniform stretch. | | | | | | |
| Comp. Ex. 7 | 0 | 10 | 1:1:1:1:1 | 3 × 6 | No specimen could be obtained because of film breakage. | | | | | | |

From Table 2, it is seen that when the intermediate layer of the film is made of the aliphatic polyamide resin alone, it is difficult to produce the film stably without causing nonuniform stretch because nonuniform stretch takes place when the film is biaxially stretched, and also the film is liable to break when the transverse stretch ratio is increased for eliminating nonuniformity of stretch.

On the contrary, it is noted that when the aromatic polyamide resin is used in combination with the aliphatic polyamide resin for forming the intermediate layer, as in the Examples of the present invention, nonuniformity of stretch does not take place and stable production of the film is made possible. This may be accounted for by that the aromatic polyamide resin serves for inhibiting crystallization of the aliphatic polyamide resin and accordingly facilitates stretching of the film, and the polypropylene-based resin layers in the surface are also uniformly stretched in accordance with the intermediate layer.

What is claimed is:

1. A biaxially stretched film for packaging, having an overall thickness of 2 to 40 μm; said film comprising surface layers each made of a propylene-ethylene copolymer resin and an intermediate layer disposed therebetween made of a copolyamide or polyamide resin composition comprising 60 to 98% by weight of an aliphatic polyamide resin and 2 to 40% by weight of an aromatic polyamide resin, said intermediate layer having thickness of 10 to 80% of the overall thickness of the biaxially stretched film; and obtained by a process comprising a coextrusion step, using water-cooled inflation or T-die molding by contacting the extrudate with a chill roll, and a stretching step.

2. A film according to claim 1, wherein the film is stretched 2 to 6 times in each of machine and transverse directions.

3. A film according to claim 1, wherein the aromatic polyamide resin is (a) a polymer composed of aliphatic diamine units and isophthalic acid units or terephthalic acid units or both, or (b) a copolyamide composed of aromatic polyamide structural units of (a) and lactam or aliphatic polyamide structural units.

4. A film according to claim 1, wherein the surface layer comprises (A) 3 to 40 parts by weight of polybutene or polyisobutylene, (B) 0.2 to 10 parts by weight of an anti-fogging agent and (C) 0.1 to 10 parts by weight of a release agent, based on 100 parts by weight of the propylene-ethylene copolymer resin.

5. A film according to claim 4, wherein the anti-fogging agent is a fatty acid ester formed from a polyhydric alcohol with 3 to 20 of hydroxyl groups.

6. A film according to claim 4, wherein the release agent is a mixed glyceride having an acyl group with a carbon number of 2 to 6 and an acyl group with a carbon number of 8 to 22.

7. A film according to claim 1, having a five-layer structure of a propylene-ethylene copolymer resin/acid-modified polyolefin resin/polyamide resin comprising 60 to 98% by weight of an aliphatic polyamide resin and 2 to 40% by weight of an aromatic polyamide resin/acid-modified polyolefin resin/polypropylene-based resin.

8. A film according to claim 1, wherein the propylene-ethylene copolymer resin has a melt flow rate of 0.5 to 10 g/10 min determined according to JIS K6758 at 230° C. under a load of 2.16 kg and a density of 0.89 to 0.91 g/cm².

9. A film according to claim 4, wherein the polybutene or the polyisobutylene has a number-average molecular weight of 200 to 5,000.

10. A film according to claim 5, wherein the fatty acid ester is one in which from one hydroxyl group to 70% of the hydroxyl groups of the polyhydric alcohol with 3 to 20 of hydroxyl groups are esterified with a higher fatty acid having a carbon number of 8 to 22.

11. A film according to claim 7, wherein the acid-modified polyolefin resin is obtained by graft reacting an unsaturated carboxylic acid or a derivative thereof which is an acid anhydride, an ester, an imide or a metal salt, with a polyolefin resin.

12. A film according to claim 11, wherein the unsaturated carboxylic acid or a derivative thereof is acrylic acid, methacrylic acid, maleic acid, fumaric acid, itaconic acid, citraconic acid, or an acid anhydride, an ester, an amide, an imide or a metal salt thereof.

13. A film according to claim 11, wherein the polyolefin resin is polyethylene, polypropylene, a random or block copolymer of propylene and 1 to 5% by weight of ethylene, a random or block copolymer of ethylene and 1 to 10% by weight of propylene, a copolymer of propylene or ethylene and 1 to 10% by weight of an α-olefin having a carbon number of 4 or greater, or a mixture thereof.

* * * * *